United States Patent [19]

Unsworth et al.

[11] Patent Number: 5,353,350
[45] Date of Patent: Oct. 4, 1994

[54] ELECTRO-ACTIVE CRADLE CIRCUITS FOR THE DETECTION OF ACCESS OR PENETRATION

[75] Inventors: Joseph Unsworth, Broadway; Michael Mapson, Sydney, both of Australia

[73] Assignee: University of Technology, Sydney, Australia

[21] Appl. No.: 847,062

[22] PCT Filed: Oct. 3, 1990

[86] PCT No.: PCT/AU90/00475

§ 371 Date: Jun. 2, 1992

§ 102(e) Date: Jun. 2, 1992

[87] PCT Pub. No.: WO91/05306

PCT Pub. Date: Apr. 18, 1991

[30] Foreign Application Priority Data

Oct. 3, 1989 [AU] Australia ............... PJ6685
Aug. 3, 1990 [AU] Australia ............... PK1574
Aug. 23, 1990 [AU] Australia ............... PK1910

[51] Int. Cl.$^5$ ............................... H04L 9/00
[52] U.S. Cl. ............................... 380/3; 380/52
[58] Field of Search ............... 380/3, 52; 340/637; 128/662; 310/311, 340, 367

[56] References Cited

U.S. PATENT DOCUMENTS

| | | |
|---|---|---|
| 4,505,842 | 3/1985 | Kurkov et al. . |
| 4,593,384 | 6/0386 | Kleijne . |
| 4,691,350 | 9/1987 | Kleijne et al. ............... 380/3 |
| 4,783,801 | 11/1988 | Kaule ............... 380/3 |
| 4,807,284 | 2/1989 | Kleijne ............... 380/3 |
| 4,811,288 | 3/1989 | Kleijne et al. ............... 380/4 |
| 4,858,075 | 8/1989 | Butterworth . |
| 4,860,351 | 8/1989 | Weingart ............... 380/3 |
| 4,991,588 | 2/1991 | Pflueger ............... 128/662 |
| 5,060,261 | 10/1991 | Avenier et al. ............... 380/3 |
| 5,070,479 | 12/1991 | Nakagawa ............... 380/3 |
| 5,086,292 | 2/1992 | Johnson et al. ............... 340/637 |
| 5,117,457 | 5/1992 | Comerford et al. ............... 380/30 |

FOREIGN PATENT DOCUMENTS

| | | |
|---|---|---|
| 41240/78 | 5/1979 | Australia . |
| 17377/88 | 12/1988 | Australia . |
| 33605/89 | 10/1989 | Australia . |
| 0128672 | 12/1984 | European Pat. Off. . |
| 0268142 | 5/1988 | European Pat. Off. . |
| 3023427A1 | 1/1981 | Fed. Rep. of Germany . |
| 3527873A1 | 2/1987 | Fed. Rep. of Germany . |
| WO88/07824 | 10/1988 | PCT Int'l Appl. . |
| WO89/09472 | 10/1989 | PCT Int'l Appl. . |
| 1575527 | 9/1980 | United Kingdom . |
| 2195478A | 4/1988 | United Kingdom . |

*Primary Examiner*—Salvatore Cangialosi
*Attorney, Agent, or Firm*—Willian Brinks Hofer Gilson & Lione

[57] ABSTRACT

An electronic circuit or device is protected from tamper and/or theft of data contained therein by encapsulation in a hosing and a polymer cradle. The cradle comprises a transducer capable of generating a voltage, detection means to detect said voltage, and protection means associated therewith to destroy and/or alter said circuit, device and/or information and/or record said voltage, characterized in that said transducer is a polymeric pressure/voltage and/or temperature/voltage transducer associated with said detection means such that on alteration of pressure or temperature applied to said transducer beyond pre-set limits, said voltage is sensed by said detection means thereby activating said protection means.

29 Claims, 4 Drawing Sheets

ELECTRO-ACTIVE CRADLE CIRCUITS FOR THE DETECTION OF ACCESS OR PENETRATION

The present invention relates to the protection of information stored within electronic circuits, and in particular, to the protection of stored data from a hardware thief or hacker.

The protection will be achieved by the use of an electroactive Cradle circuit. A cradle is defined here as "a framework for support or protection" (refer Collins Australian Dictionary of the English Language, 1981).

BACKGROUND ART

With the development of extensive computerised memory and the need for confidentiality of data stored within that memory, there have been developed a number of methods of preventing the theft of that "secret" information. Traditionally, computer software has been protected by means of encryption and decryption programming. Also, encryption and decryption hardware elements have been incorporated into specific electronic packages to perform data protection under software control. With the development of suitable algorithms and keys contained in alterable memory, it has been possible to successfully protect data from an information thief or hacker who attempts to access that data by software means.

However, these known methods offer little security from a hardware hacker who obtains electronic information through physical access to such electronic circuitry. Electronic information or data compromise can occur by drilling through existing encapsulants of electronic circuitry so as to access data and/or address buses. These may be located by X-ray radiography and/or ultrasonic techniques. Alternatively, employment of thermal, solvent, acid, simple mechanical scraping or mechanical fracture methods can be used to expose the data and/or address buses associated with the alterable memory.

Such alterable memory can comprise EPROM, $E^2$-PROM, RAM, DRAM and PROM. Some devices though having some protection, permit learning of the methodology so that a thief can steal one device and therefore know the next. However, the hardware hacker can obtain no information from a severed communication channel external to the device due to software methods such as encryption and authentication procedures. Once the information thief or hacker has gained the knowledge of the authentication procedures and the data codes necessary, one could make use of this information to advantage. These types of security problems are particularly relevant to financial institutions which use security systems to secure computerised transfer of funds, the value of which is several millions of dollars per hour. In the case of a financial institution, once an information thief or hacker has gained the authentication procedure and the necessary data codes, illicit funds transfer could occur and the transfer would appear as a legal and authorised transaction. As such, any security compromise could result in the financial institution incurring fraud losses, loss of integrity, recovery costs, adverse publicity and loss of commercial confidence.

U.S. Pat. Nos. 4,593,384; 4,691,350; 4,807,284 and 4,811,288 cover the area of securing stored data using a device that physically surrounds the circuit board being protected.

The security device in the 4 patents is comprised of:

1) a number of ceramic components that form a box that surrounds the circuit board. Ceramic is used because of its chemical resistance, 2) within the ceramic components are a number of conductive epoxy paths and sheets through which a hacker would penetrate if attempted penetration occurred, 3) in certain embodiments these conductive paths may also be connected via thin wires that pass through the circuit board, 4) in a further embodiment thin nickel/gold layers were deposited onto the inside face of the ceramic housing. These layers were then etched to form parallel gold conductive paths (10–25 $\mu$m thick with same spacing).

5) by shorting or breaking the conductive paths or sheets, a sense circuit will generate a low voltage that sets the RESET on the memory to be protected, and 6) a low temperature sensor (an unbalanced circuit) will also generate a low voltage if the temperature falls below $-25°$ C. This ensures that if an attempt is made to freeze the memory below $-90°$ C. in order to bypass the security device, the memory will be destroyed and thus protected.

U.S. Pat. No. 4,783,801 is for a security device to protect a circuit board. The security device is comprised of:

1) a housing in which one or more detectors may be situated. These detectors being vibration detectors, thermometers, microphones or conductive paths that are shorted or broken upon penetration, and 2) the interface circuitry includes a clock arrangement that turns on the detectors for short intervals (i.e.: 10 ms every second) leading to a saving of up to 99% of the battery power and ensuring that the battery does not have to be periodically replaced. The interface can also decide whether to destroy the memory using majority information from its detectors. (i.e. 3 detectors out of 5 say yes then the interface corrupts the memory).

U.S. Pat. No. 4,860,351 relates to a security device for a circuit board. The security device is comprised of:

1) very thin insulated Nichrome wire is wrapped in very tight coils around the circuit to be protected. The circuit and enclosing wire is potted within an opaque cross-linked filled epoxy. The filler in the epoxy is alumina or silica which makes the epoxy difficult to machine, 2) if penetration is attempted the wires are shorted or broken, the interface circuit will sense this and destroy the memory, and 3) the wire is wrapped as several strands which enhances sensitivity to shorts and reduces EMI pickup due to cancellation. The wire wrap also forms an EM shield.

Such techniques have been proposed to provide protection against such compromise or ingress. However, these methods are complex and integrated with the device to be protected, thus making that device irreparable. Overall, this invention is based on different materials and methods which will offer protection to data system(s) including such memory devices indicated below whilst permitting economic repairability and therefore recycling of that device.

Various methods are known to prevent or frustrate transmission of x-rays and other short wavelength radiation.

AU 41240/78 teaches that barium titanate, barium fluoride and lead sulfate can be added to an organo polysiloxane resin for X-ray shielding applications.

AU 17377/88 teaches that barytes can be added to Plaster-of-paris up to 60% by weight with Plaster-of-paris 35% by weight and other fillers, sealers and hardeners comprising the other 5% by weight. It is envisaged for use as an economic alternative to lead in floor, wall and ceiling shielding in hospitals.

WO89/09472 relates to oxides, hydroxides and salts of bismuth loaded into polyethylene at weight fractions ranging from 30 to 80% for use as flexible protection in surgical clothing such as gloves, aprons, boots and overalls.

GB 1 575 527 describes X-ray opaque surgical sponges using elastomers (i.e: polyisobutylene, PVC and copolymers of VA and VC) loaded with 40 to 90% weight fraction barium sulphate.

Such methods can be used to enhance the devices of the present invention.

DISCLOSURE OF THE INVENTION

It is an object of the present invention to substantially overcome or ameliorate, the abovementioned difficulties through provision of one or more transducers, which may be used in association with an encapsulant or housing which protects electronic circuit(s) that contain data required to be protected from the effects of hardware hacking. In certain applications both the transducer and the encapsulant or housing will be capable of being employed separately to provide protection. For example the transducer components could be supported via a suitable alternative support while the encapsulant could be used to provide a X-ray attenuating mechanical barrier to frustrate attempted penetration.

In accordance with one aspect of the present invention, there is disclosed an electronic circuit or device protected from tamper and/or theft of information contained therein, comprising said circuit, a transducer capable of generating a voltage, detection means to detect said voltage, and protection means associated therewith to destroy and/or alter said circuit, device and/or information and/or record said voltage, characterized in that said transducer is a polymeric pressure/voltage and/or temperature/voltage transducer associated with said detection means such that on alteration of pressure or temperature applied to said transducer beyond pre-set limits, said voltage is sensed by said detection means thereby activating said protection means.

In another aspect, the invention provides a method of protecting an electronic circuit or device or information stored therein from tamper and/or theft that occurs through an examination of said circuit or device, said method comprising providing a polymeric pressure/voltage and/or temperature/voltage transducer capable of generating a voltage adjacent said circuit or device, said transducer being associated with detection means to detect said voltage, and protection means associated with said detection means, such that on alteration of pressure or temperature applied to said transducer beyond pre-set limits, said voltage is sensed by said detection means thereby activating said protection means to destroy and/or alter said circuit, device and/or information and/or record said voltage.

The circuits or devices which may be protected in accordance with the present invention may include signal processing circuits, encryption/decryption circuits, alterable memories and the like. The circuits or devices of the invention can be protected by a single transducer which may be a pressure/voltage transducer or a temperature/voltage transducer. It is preferred that both a pressure/voltage transducer and a temperature/voltage transducer be used.

The transducer may be arranged to fully cover or enclose the circuit so that any attempt to access the combination is required to pass through the transducer.

The detection means may be located within or adjacent to the transducer and preferably comprises at least two electrodes associated with the circuit. One of the electrodes may be earth. In order to disguise the transducer from examination by electromagnetic radiation and/or acoustics, it is preferred that the electrodes are non-metallic. For some applications the detection means may include an associated electronic circuit, such as an amplifier, which may be located within or adjacent the transducer.

The transducer may contain an external or integrated switching means to prevent inadvertent activation of the protection means. It is preferred that a destructible conducting element may be provided adjacent the transducer to short-circuit the electrodes to prevent activation of the protection means prior to destruction of the conducting element. In general, the protection means will be activated only when the output of the detection means exceeds preset limits.

In a preferred embodiment of the invention, the transducer output is disabled by connection of the detection means by metallic or non-metallic electrical conductors to a gating circuit or device which prevents the active output of the transducer being transmitted to the detector. The gating circuit can be controlled by elements of metallic or non-metallic components of a bridging circuit. The conditions of the bridging circuit can be altered by breaking due to penetration of one or more bridge elements.

In an alternate preferred embodiment of the invention, the transducer is disabled by having the electrodes of the detection means connected by metallic or non-metallic conductors thus preventing the buildup of charge and hence prevent spurious or unwanted generation of voltage signals due to normal vibration or temperature variations. The connection may be affected in such a way so as to be broken upon any penetration through to the transducer. On breaking of the connection, the transducer is immediately enabled to generate a voltage due to an attempted penetration.

Where it is desired to protect a circuit or device from the effects of aggressive chemicals such as solvents, oxidising agents and/or reducing agents, the transducer can be modified so as to generate a voltage on contact with the aggressive chemical. Alternately, a further chemical sensing/voltage transducer may be provided as part of the circuit or device. Such a further transducer can be constructed from a conducting polymer having groups or radicals incorporated therein which react with the aggressive chemical or from a piezo-electric polymer coated with a material which reacts with such aggressive chemicals.

For some applications, it may be desirable to make the circuit, or transducer unable to be examined by electromagnetic radiation or acoustics to prevent/frustrate examination of the circuit or parts thereof with an acoustics or electromagnetic radiation resistant encapsulating element. The element may also be formulated to be resistant to agressive chemicals. It is preferred that the encapsulating element is formulated to achieve the maximum electromagnetic and/or acoustic and/or chemical attenuation whilst remaining both non-corrosive to contained components and electrically insulating. For example, the encapsulating element can be formulated with high atomic number compounds in a supporting material such as epoxy or polyurethane, in quantities up to and beyond 80% w/w. For some applications, the encapsulating element may be formulated with small quantities of metal arranged throughout the element to further disguise the configuration of the circuit or device or part thereof. The encapsulating element may also include ceramic materials to further prevent/frustrate mechanical ingress and/or an electrical insulation layer.

To those skilled in the art, the well catalogued cryogenic threat of rapid cooling, to temperatures below −90° C., of circuitry to ensure preservation of data, may be overcome by the inclusion of temperature sensors working in conjunction with the cradle and/or its signal processing circuitry. The thresholds of these sensors would be determined by the operating environment of the device being protected. In addition, to ensure the preservation of the piezoelectric effect in the piezoelectric sensing material, a high temperature sensing element may be included as part of the signal processing circuitry.

Conventional devices such as silicon integrated circuits, transistors, resistors and capacitors in addition to equivalent devices made from electroactive polymers, will as a circuit receive the detection signal, perform any necessary signal processing and output to the associated circuit being protected, a predetermined signal in response to the intrusion or investigation.

The signal processing which might typically be performed by the polymer cradle circuits in conjunction with existing conventional electronic devices would be amplification, comparison, clipping, filtering as well as known logic functions. Signal processing could be carried out as an integral part of the cradle device or separately by the electronics board being protected. Power, if required, could be derived from the application electronics board or be supplied from an auxiliary source, for example a lithium cell. The decision whether or not a dead or decaying power source condition causes circuit initiation (e.g.: failsafe) may be left up to the application subject to that protection.

Polymers suitable for processing into pressure/voltage and temperature/voltage transducers are generally halogen containing polymers which are available commercially. Poly(vinylidene fluoride), poly(vinylidene fluoride-trifluoroethylene), polytetrafluoroethylene, polyvinyl chloride, polyvinyl fluoride or copolymers thereof are examples of the polymers available. In order to achieve higher piezoelectric and pyroelectric activity, these polymers should be stretched and polarized. The stretching of the polymer, followed by polarization in intense electric fields at elevated temperatures aligns the dipole moments within the film, producing the desired piezoelectric and pyroelectric effect. In order to polarize and use these polymers, electrically conducting electrodes can be deposited onto the faces of the material, to which electrical conductors may be connected. It is advantageous for certain applications to utilize single face electrode connections, achieved by forming separated electrodes on the one face.

Such piezoelectric and pyroelectric polymers are tough, lightweight, flexible and may be formed into complex shapes suitable for any application.

There is well established use of semi-conducting polymer composites or compounds which are made by the addition of conducting particles, such as silver, aluminium or carbon, to a polymer. However these materials cannot be made to have sufficiently high conductivity for many applications. There are now available a wide range of relatively new intrinsic conducting, semiconducting and piezoelectric polymers which can be synthesized in the laboratory, a few of which are available commercially. Polyacetylene, poly p-phenylene, polyaniline, polythiophene, polyquinoline, polypyrrole and polypyrrone are some of the many intrinsically conducting and semiconducting polymers which can be chosen for the fabrication of electronic devices and circuits. A wider range of specific conductivities can be obtained than that possible using conducting polymer/compound composites. These new electroactive polymers are also more suitable for fabrication of electronic transducers. For example, polypyrrole can be synthesized to have a wide range of conductivity by aqueous or organic electro-chemistry using different concentrations of sodium p-toluene sulphonate as the dopant dissolved in the electrolyte. The deposited film of polypyrrole can be changed in shape by modifying the geometry of the anode formed to make a three-dimensional frame work. Using conducting and semiconducting polymers, a wide range of polymer pn junctions, transistors, chemsensors and batteries are being researched.

BEST MODES OF CARRYING OUT THE INVENTION

A preferred embodiment of the present invention will now be described with reference to the drawings that illustrate the present invention.

An example of an electronic device which may be protected in accordance with the present invention is that of an alterable memory 1 as earlier described. Generally associated with the alterable memory 1 is a data encryption/decryption circuit or application specific data processing device 2 that interfaces the alterable memory 1 with a data connection 3 that provides communication with other devices (not illustrated). Note that the application specific processing device may exist in hard or software form. An example of such a device as now described would be a Personal Identification Number (PIN) pad used in automatic telling machines (ATMs) and electronic funds transfer point of sale (EFTPOS) machines operated by banks and other financial institutions. In such an example, the alterable memory 1 would contain a key or a series of keys required for the encryption processes typically carried out in a Personal Identification Number encryption transaction. Access to the key(s) contained within the alterable memory 1, could enable an information thief to compromise the system integrity.

In this manner, the memory 1, application specific processing device, or the cryptographic device 2, contains confidential information desired to be protected from hardware hacking.

Figure 1:
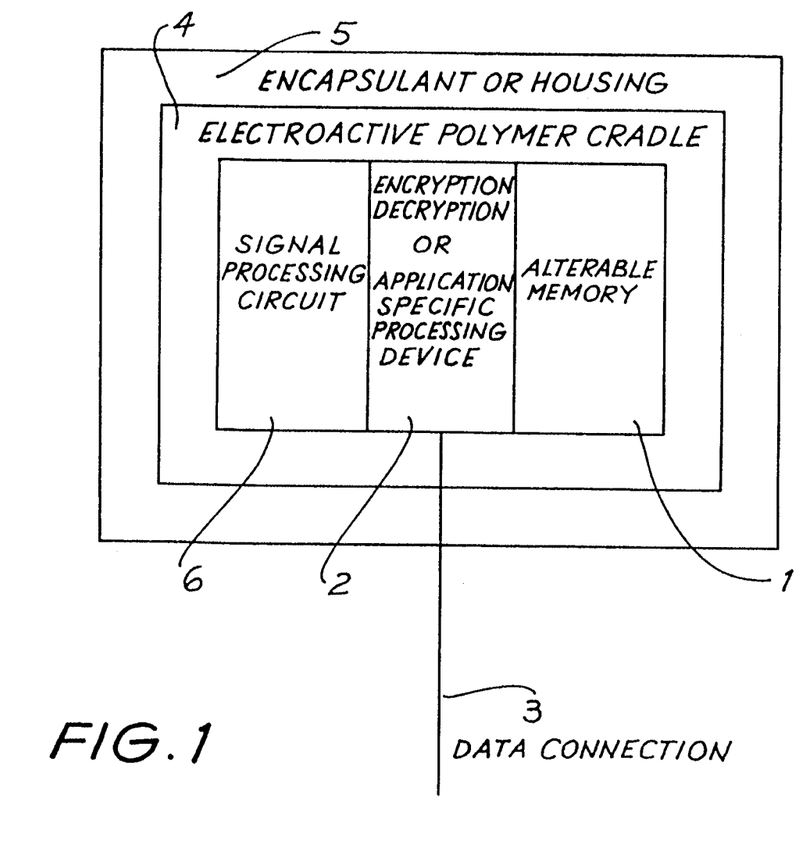
FIG. 1 is a plan view of the device that embodies the present invention.
Figure 2:
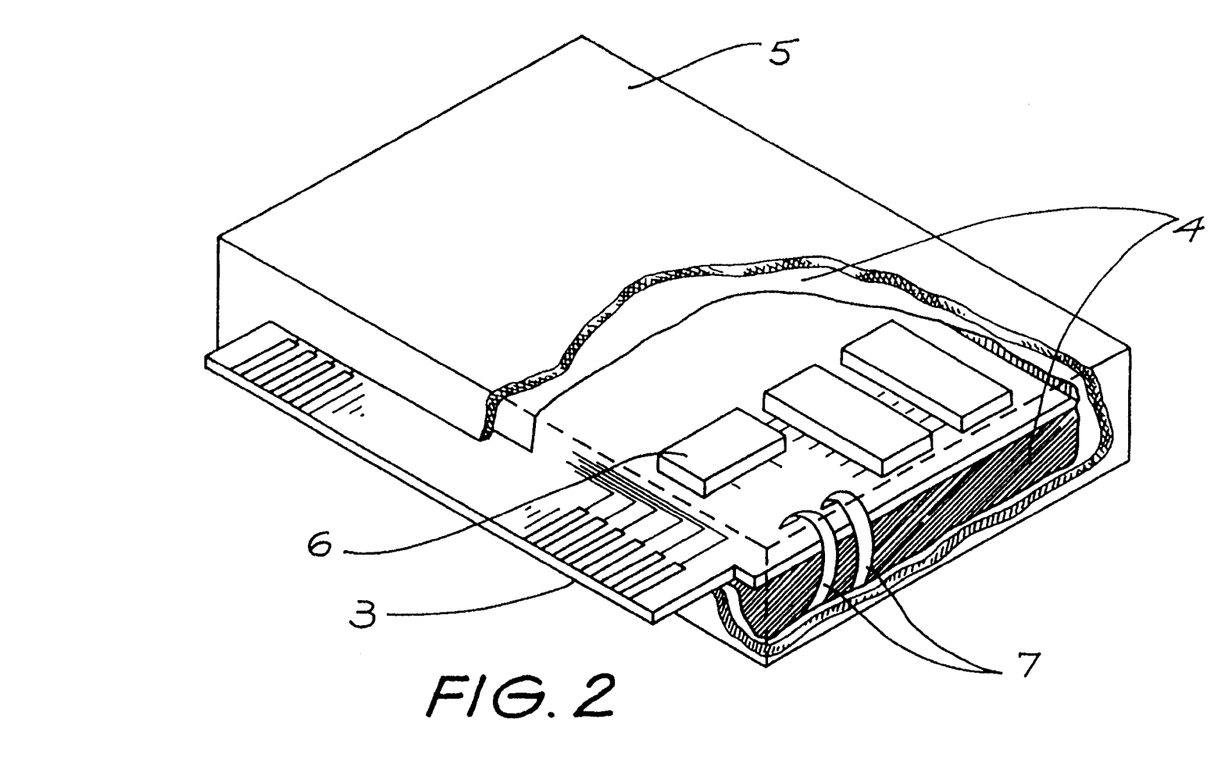
FIG. 2 is a cut-away of an example of how the cradle encloses the device to be protected.
Figure 3:
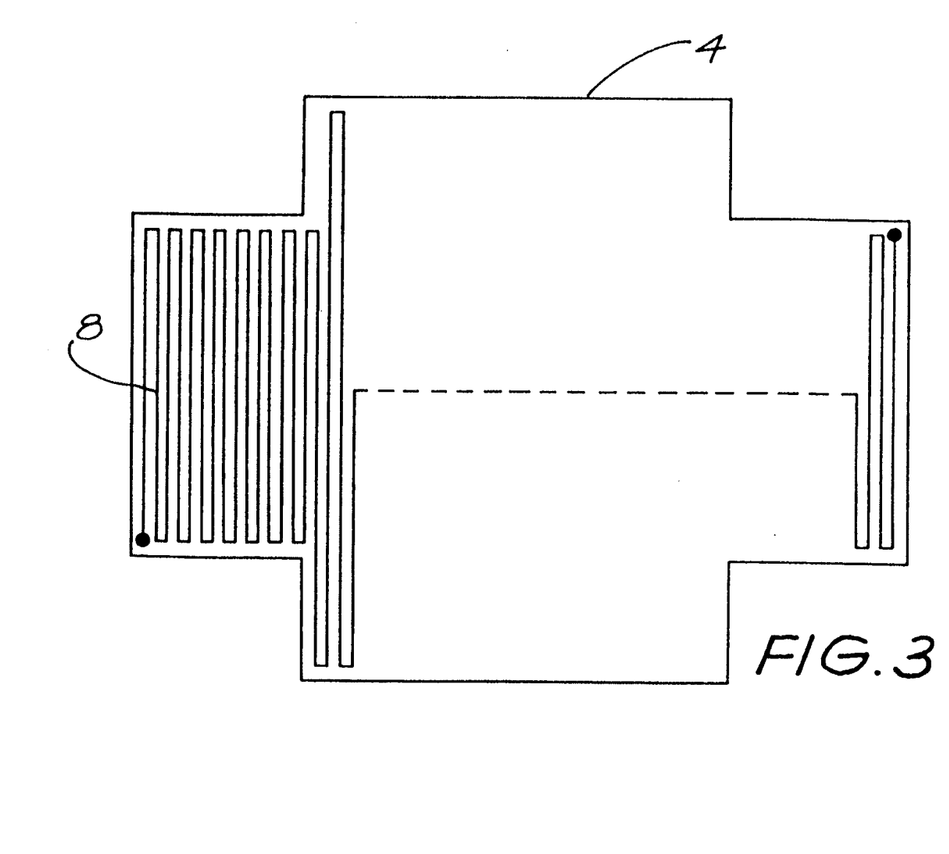
FIG. 3 is a plan view of an example of how the cradle is formed.
Figure 4:
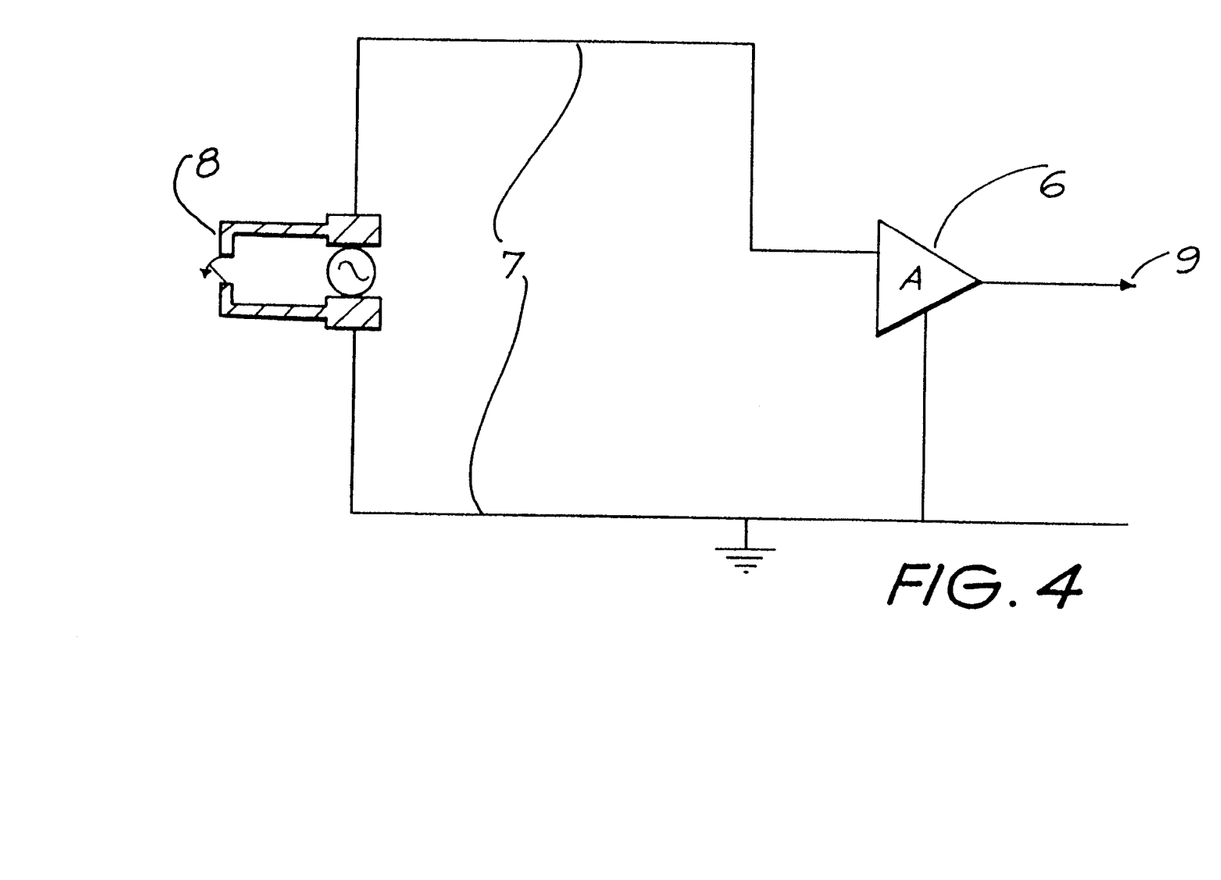
FIG. 4 is a schematic example of the signal processing circuitry.

The circuit combination of the alterable memory 1 and data encryption/decryption circuit or application specific device 2 are enclosed within an electroactive polymer cradle 4 (Ref: FIGS. 1, 2 and 3). The electroactive polymer cradle 4 is interfaced to the circuit combination 1 and 2 via a signal processing circuit 6 utilising metallic or non-metallic electrical conductors 7. The signal processing circuit 6 (Ref: FIG. 4) comprises fundamentally of a low power amplifier capable of saturation at its output 9, replicating digital conditions and driven by the analog cradle output. The electroactive polymer cradle 4 covers all three dimensions of the circuit combination 1, 2, 6 and 7 such that the data connection 3 is the only physical connection from outside the cradle 4 to within the circuit combination 1, 2, 6 and 7. (Ref: FIGS. 1 and 2). It will be apparent therefore that the cradle 4 draws no electrical power from the data connection 3 and is therefore entirely passive and has a lifetime of essentially indefinite duration, particularly when compared to electrically powered protection devices. The polymer cradle 4 may also be enclosed within an encapsulant or housing 5. The data connection 3 can be arranged to exit the encapsulant or housing 5 in the form of connecting pins or a cable or leads (not illustrated).

It will be realised by those skilled in the art that an information thief that obtains that information by accessing through software techniques, would be resisted in any efforts by the encryption/decryption circuit or application specific processing device 2 and/or any one-way functions (OWFs) therein. As such, the alterable memory 1 is safe from software intervention as previously known in the art.

The electroactive polymer cradle 4 comprises electroactive polymer circuit(s). The polymer circuit(s) is arranged to fully cover (2-dimensional) or enclose (3-dimensional) the circuit combination 1, 2, 6 and 7 so that any attempts to hardware access the combination 1, 2, 6 and 7 are required to pass through the electroactive polymer cradle 4.

The electroactive polymer cradle comprises a variety of polymer devices linked by polymer or metallic electrical conductors. Some of these polymer devices are sensing elements, chemsensors, piezoelectric transducers and thermal sensing elements. These sensors may be made sensitive to physical and/or chemical ingress to provide stimuli to other devices located within the cradle. It is also possible that the sensors be sensitive to investigation by acoustic waves, electromagnetic radiation and particle beams. Once activated by any ingress or destructive investigation of the cradle, the electroactive polymer circuit then emits a signal(s) in order to record the event or to initiate the alteration, corruption and/or destruction of the information stored within the alterable memory 1. This same method can also be adapted to initiate the alteration, corruption or destruction of the data used by or stored by the encryption/decryption or application specific algorithm within the encryption/decryption or application specific device 2.

The cradle output is normally inactive, and in view of the cradle 4 representing a polymer short-circuit, it is not subject to electronic drift at its outputs. Activation would occur as a result of any one of the aforementioned methods of hardware hacking and thus negate any criminal learning process. For certain applications, it is proposed that the cradle only be sensitive to a destructive penetration or attack that is being undertaken and not sensitive to external impacts or vibrations that will occur in everyday use of the types of circuits and devices that are to be protected. The electroactive polymer cradle 4 would remain in a "switched off" mode until an attempted penetration occurred. To switch off the electroactive polymer cradle 4, the electrodes 8 (Ref: FIGS. 3 & 4) of the electroactive polymer cradle 4 would be formed in such a manner, that no output can occur. FIG. 3 illustrates an example of the electroactive polymer cradle 4 from which plane electrode material has been removed to form an electrical pathway. On penetration of the electroactive polymer cradle 4, the electrode 8 conditions would be modified making the cradle output active.

Alternatively, the electrodes of the electroactive polymer cradle 4 could be connected by metallic or non metallic electrical conductors 7 to a gating circuit which would normally prevent the electroactive polymer cradle 4 from transmitting its output(s) to the signal processing circuit 6. The conductors could form for example, elements of a balanced bridging circuit which would control the previously mentioned gating circuit. These conductors would be affected in such a way that any penetration through to the electroactive polymer cradle 4 would alter the balance between these conductors and influence the gating circuit.

The above arrangements provide predeterminable limits for handling, vibration, abrasion and the like of the cradle 4, at which destruction of the protected information will occur.

The encapsulant or housing 5 may surround the electroactive polymer cradle circuit 4, its purpose being three-fold;

a) to mechanically support and contain the electroactive polymer cradle circuit 4 and the device or circuit being protected.

b) to prevent/frustrate examination or location of the electroactive polymer cradle circuit 4 and the metallic buses, terminals and conducting paths of the enclosed electronic devices by X-ray methods and/or acoustics. It is also possible that the encapsulant or housing 5 could be formulated to prevent/frustrate examination or location by gamma rays, neutron beams and electromagnetic waves.

c) to prevent/frustrate dissolving or swelling in common solvents.

The encapsulant or housing 5 when necessary will be formulated to achieve the maximum possible X-ray attenuation whilst remaining both non-corrosive to contained components and electrically insulating. High atomic number metallic salts and oxides, for example, barium and/or lead salts (e.g. Barytes and Litharge) would be added to a supporting material such as epoxy or polyurethane polymers in quantities up to and beyond 80% w/w. Small quantities of metal could also be arranged throughout the encapsulant or housing 5 to further disguise the actual position of the contained polymer cradle circuit and device(s) or circuit(s) being protected.

As an enhancement for certain applications, fillers and/or hardeners would be incorporated into the encapsulant or housing 5 to further prevent/frustrate mechanical ingress. In certain applications conducting materials either metallic or non-metallic would be incorporated into the encapsulant or housing 5 to provide an electromagnetic radiation shield that could be used for radiation hazard attenuation. When required an electrical insulation layer would also be added to the encapsulant or housing 5.

INDUSTRIAL APPLICABILITY

The present invention can be applied in general to any type of computing device, microprocessor, electronic device, storage element and logic element that contains information that is not to be disclosed. Also it can be used in any circuit or similar device that might be required to operate or fail in a desired or predetermined manner when subjected to forces, measures, or substances constituting intrusion.

The above described example of protecting keys used in funds transfer in Personal Identification Number (PIN) pads. Electronic Funds Transfer-Point of Sale (EFTPOS) or general information security is applicable throughout the financial industry as well as broader uses relating to electronically stored information.

The present invention also has well placed application in the defence, communications, electronics and computing industries. Examples of possible areas of application are encryption/decryption processes and devices, smart card peripherals and magnetic stripe readers (MSRs).

A further application is in the protection of devices that control the function of, and the arming of explosives and ordinance.

The present invention offers to users of electronically stored information a means by which that information can be securely stored without the possibility of theft. As such, devices protected in accordance with the present invention have applications throughout the financial and defence industries as well as in the general computing/electronics industry.

The foregoing only describes one embodiment of the present invention and further embodiments, obvious to those skilled in the art, can be made thereto without departing from the scope of the present information.

We claim:

1. An electronic device comprising an electronic circuit with data to be protected from hardware hacking, a polymeric transducer substantially enveloping the electronic circuit for generating a voltage when the device is tampered with beyond a predetermined limit, means for detecting said voltage, and means for protecting the data upon detection of said voltage by one of altering and destroying the data.

2. The device of claim 1 wherein the electronic circuit is one of a signal processing circuit, a cryptographic circuit, and an alterable memory.

3. The device of claim 1 wherein said transducer is one of a pressure to voltage transducer, and a temperature to voltage transducer.

4. The device of claim 1 wherein the transducer comprises a halogen containing a polarized polymer selected from the group consisting of poly(vinylidene fluoride), poly(vinylidene fluoridetrifluoroethylene), polytetrafluoroethylene, polyvinyl chloride, polyvinyl fluoride, and copolymers thereof.

5. The device of claim 1 wherein the transducer is arranged to fully cover and enclose the circuit so that any attempt to access the circuit is required to pass through the transducer.

6. The device of claim 1 wherein the means for detecting comprises at least two electrodes connected to the transducer, said electrodes being selected from the group consisting of metallic electrodes and non-metallic electrodes.

7. The device of claim 1 wherein said transducer comprises a means for switching to prevent inadvertent activation of said means for protecting.

8. The device of claim 6 further comprising a destructible conducting element adjacent said transducer to short-circuit said electrodes to prevent activation of the means for protecting prior to destruction of said conducting element.

9. The device of claim 1 wherein an output of the transducer is disabled by connection of the means for detecting to a gating circuit by electrical conductors to prevent said voltage being transmitted to the means for detecting, said gating circuit being controlled by elements of of a balanced bridging circuit, said bridging circuit being altered by breaking of at least one bridge element.

10. The device of claim 5 wherein the transducer is disabled by having inputs of the means for detecting connected by conductors thereby preventing a buildup of charge on the conductors, and wherein the connection is affected in such a way so as to be broken upon any penetration through to the transducer and, on a braking of the connection, the transducer is immediately enabled to generate said voltage.

11. The device of claim 1 wherein one of said circuit and said transducer is resistant to an energy source used in the examination of the device, said energy source being one of electromagnetic radiation, acoustic energy, and predetermined chemicals.

12. The device of claim 11 wherein one of said circuit and said transducer is opaque to said energy source.

13. The device of claim 11 further comprising an encapsulating element which resists the energy source and encloses the circuit, transducer, means for detecting, and means for protecting.

14. The device of claim 13 wherein the encapsulating element is formulated with high atomic number compounds in a supporting material in quantities up to an beyond 80% w/w.

15. The device of claim 14 wherein the supporting material is one of epoxy and polyurethane.

16. The device of claim 13 wherein the encapsulating element is formulated with predetermined quantities of metal arranged throughout the element to disguise the configuration of the device.

17. The device of claim 13 wherein the encapsulating element includes ceramic materials to prevent mechanical ingress into said device beyond said element.

18. The device of claim 13 wherein the encapsulating element includes an electrical insulation layer.

19. A method of protecting an electronic apparatus from hardware hacking intended to gain access to confidential information contained in the electronic apparatus, the method comprising enveloping the apparatus with a polymeric transducer adapted to output a voltage to the apparatus when hardware hacking is attempted to gain access to the apparatus, wherein the voltage acts upon the apparatus to alter the apparatus, thereby preventing disclosure of the confidential information.

20. A method as claimed in claim 19 wherein the hardware hacking involves one of physical penetration, physical scraping, chemical ingress, electromagnetic imaging, and ultrasonic scanning.

21. A method as claimed in claim 19 wherein the confidential information comprises data retained in a memory storage device arranged within the apparatus.

22. A method as claimed in claim 21 wherein the voltage acts to alter the data and corrupt the confidential information.

23. A system as claimed in claim 19 further comprising means for processing having electrode inputs connected to the means for detecting and outputs connected to the electric circuit, the means for processing receiving the voltage via the electrodes and applying a processed version of the voltage to the electronic circuit to alter the confidential information.

24. A protection system for protecting confidential information retained in an electronic circuit, the system comprising a polymeric transducer means for detecting a hardware hacking attempt on the circuit which envelopes at least the circuit, wherein the means for detecting is passive and only enabled upon a hardware hacking attempt.

25. A system as claimed in claim 24 wherein the means for detecting fully encloses the circuit, thereby preventing the hacking from any direction.

26. A system as claimed in claim 24 wherein the means for detecting, upon detecting a hacking attempt, alters the confidential information, thereby preventing successful hacking of the information.

27. A system as claimed in claim 24 wherein the electronic circuit is one of a signal processing circuit, an encryption device, a decryption device, and a memory storage device.

28. A system as claimed in claim 27 wherein the memory storage device comprises alterable memory, wherein the alterable memory comprises one of an EPROM, $E^2$PROM, RAM, DRAM, and PROM.

29. A system as claimed in claim 27, wherein the memory storage device comprises a hardwired read-only memory circuit.

* * * * *

UNITED STATES PATENT AND TRADEMARK OFFICE
CERTIFICATE OF CORRECTION

PATENT NO. : 5,353,350
DATED : October 4, 1994
INVENTOR(S) : Joseph Unsworth et al.

Page 1 of 2

It is certified that error appears in the above-indentified patent and that said Letters Patent is hereby corrected as shown below:

On the Title Page: Item [56]:

In column 1, line 27, under "References Cited U.S. PATENT DOCUMENTS", delete "6/03o6" and substitute --6/1986--.

In column 3, line 6, der "References Cited U.S. PATENT DOCUMENTS", delete "380/30" and substitute --380/3--.

In column 3, line 25, under "ABSTRACT", delete "hosing" and substitute --housing (5)--.

In column 3, line 25, under "ABSTRACT", delete the second occurrence of "a" and substitute --electroactive--.

In column 3, line 25, under "ABSTRACT", after the first occurrence of "cradle", insert --(4)--.

In column 3, line 25, under "ABSTRACT", after the second occurrence of "cradle", insert --(4)--.

Column 10:

In claim 14, line 39, delete "an" and substitute --and--.

In claim 14, line 40, delete "beyond80%" and substitute --beyond 80%--.

UNITED STATES PATENT AND TRADEMARK OFFICE
CERTIFICATE OF CORRECTION

PATENT NO. : 5,353,350
DATED : October 4, 1994
INVENTOR(S) : Joseph Unsworth et al.

It is certified that error appears in the above-indentified patent and that said Letters Patent is hereby corrected as shown below:

Column 11:

In claim 23, line 7, delete "electric" and substitute --electronic--.

Column 12:

In claim 29, line 18, delete "only memory" and substitute --only-memory--.

Signed and Sealed this

Third Day of December, 1996

Attest:

BRUCE LEHMAN

*Attesting Officer*      *Commissioner of Patents and Trademarks*